(12) United States Patent
Schaefer (10) Patent No.: US 10,401,194 B2
(45) Date of Patent: Sep. 3, 2019

(54) SENSOR FOR DETERMINING AT LEAST ONE ROTATION CHARACTERISTIC OF A ROTATING ELEMENT

(71) Applicant: Robert Bosch GmbH, Stuttgart (DE)

(72) Inventor: Holger Schaefer, Bad Berka (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 15/514,866

(22) PCT Filed: Aug. 17, 2015

(86) PCT No.: PCT/EP2015/068820
§ 371 (c)(1),
(2) Date: Mar. 28, 2017

(87) PCT Pub. No.: WO2016/058731
PCT Pub. Date: Apr. 21, 2016

(65) Prior Publication Data
US 2017/0219380 A1    Aug. 3, 2017

(30) Foreign Application Priority Data
Oct. 14, 2014   (DE) .................. 10 2014 220 783

(51) Int. Cl.
*G01B 7/30*     (2006.01)
*G01D 5/14*     (2006.01)
(Continued)

(52) U.S. Cl.
CPC ........... *G01D 5/145* (2013.01); *G01D 5/2497* (2013.01); *G01P 3/487* (2013.01)

(58) Field of Classification Search
CPC . G01B 7/30; G01B 7/14; G01D 5/145; G01D 5/142; G01D 5/2451; G01D 5/2454; G01P 3/487; G01P 3/488
See application file for complete search history.

(56) References Cited

U.S. PATENT DOCUMENTS

| 5,019,776 A | * | 5/1991 | Kawamata ............ G01D 5/145 324/207.12 |
|---|---|---|---|
| 6,448,760 B1 | | 9/2002 | Neumann et al. |

(Continued)

FOREIGN PATENT DOCUMENTS

| CN | 101213424 A | 7/2008 |
|---|---|---|
| CN | 101978242 A | 2/2011 |

(Continued)

OTHER PUBLICATIONS

International Search Report dated Nov. 17, 2015 for International Application No. PCT/EP2015/068820.

*Primary Examiner* — Minh N Tang
(74) *Attorney, Agent, or Firm* — Norton Rose Fulbright US LLP; Gerard Messina (57) ABSTRACT

A sensor is provided for determining at least one rotation characteristic of a rotating element. The sensor includes a sensor wheel, which is connectable to the rotating element, including at least one first reading track. The reading track includes a first plurality of magnetic event timers. The sensor furthermore includes at least one magnetic sensor for detecting magnetic events generated by the first plurality of magnetic event timers. The first reading track is designed in such a way that, over a complete circumference of the sensor wheel, a magnetic field strength of the first plurality of event timers changes step-by-step from a first maximum north pole to a first maximum south pole.

11 Claims, 8 Drawing Sheets

(51) Int. Cl.
*G01P 3/487* (2006.01)
*G01D 5/249* (2006.01)

(56) References Cited

U.S. PATENT DOCUMENTS

| | | | |
|---|---|---|---|
| 6,935,195 B2 * | 8/2005 | Tokumoto | G01D 5/2452 73/862.334 |
| 9,912,216 B2 * | 3/2018 | Konradi | B60S 1/08 |
| 2010/0159331 A1 | 6/2010 | Lee et al. | |
| 2010/0261050 A1 | 10/2010 | Kang et al. | |
| 2012/0105055 A1 * | 5/2012 | Takahashi | F16C 41/007 324/207.25 |
| 2012/0229126 A1 | 9/2012 | Maeda et al. | |
| 2014/0045065 A1 | 2/2014 | Bao et al. | |
| 2016/0061630 A1 * | 3/2016 | Ausserlechner | G01D 5/145 324/207.21 |

FOREIGN PATENT DOCUMENTS

| | | |
|---|---|---|
| DE | 19701927 C1 | 6/1998 |
| DE | 19928557 A1 | 9/2000 |
| DE | 10 2012 221 327 A1 | 5/2014 |
| JP | 3262919 B2 | 3/2002 |
| JP | 2008145284 A | 6/2008 |
| JP | 2014167427 A | 9/2014 |
| WO | 2011156419 A2 | 12/2011 |
| WO | 2013052916 A1 | 4/2013 |

* cited by examiner

SENSOR FOR DETERMINING AT LEAST ONE ROTATION CHARACTERISTIC OF A ROTATING ELEMENT

BACKGROUND INFORMATION

Numerous conventional sensors can detect at least one rotation characteristic of rotating elements. Rotation characteristics are to be understood in general as characteristics which at least partially describe the rotation of the rotating element. These may be, for example, angular velocities, rotational speeds, angular accelerations, rotation angles, angle positions, or other properties in this case, which may characterize a continuous or discontinuous, uniform or non-uniform rotation of the rotating element. Examples of such sensors are described in Konrad Reif (editor): Sensoren im Kraftfahrzeug [sensors in motor vehicles], first edition, 2010, pages 63-73 and 120-129.

German Patent Application No. DE 10 2012 221 327 A1 describes a speed sensor, which has at least one magnetic sensor, to enable a detection of the events generated by magnetic event timers of a first reading track in at least one first speed range of a rotating element and to enable a detection of the magnetic events generated by magnetic event timers of a second reading track in at least one second speed range, which is different from the first speed range, a number of the magnetic event timers of the second reading track exceeding a number of the magnetic event timers of the first reading track by at least a factor of 1.4.

A particular focal point of the present invention, to which the present invention is basically not restricted, however, is the detection of an absolute angle position of a camshaft. Camshaft sensors are typically used for synchronization between camshaft and crankshaft during an engine start. Crankshaft and camshaft are each equipped with a sensor wheel. For the camshaft, a tooth-gap pair on the sensor wheel is normally used for each cylinder. Accordingly, a four-cylinder engine has a sensor wheel including four tooth-gap pairs on the camshaft. Sensors which are based on the Hall effect or an XMR principle (X-magnetoresistive) are used for the measurement. A permanent magnet is typically installed in these sensors, whose magnetic field is modulated by the rotating sensor wheel. This modulated magnetic field may be detected with the aid of the mentioned principles and therefore converted into a usable signal. The camshaft sensor is used for the coarse detection of the engine cycle or the determination of which engine cycle the engine is in, i.e., the cylinder position. The sensors may have a function for the unambiguous detection of a tooth or a gap. The sensors may also have a function in which the sensor may be pivoted in relation to the running direction of the sensor wheel, without the sensor signal being interrupted. All sensors detect the tooth edges of the sensor wheel teeth.

In spite of the improvements caused by these sensors, there is still potential for improvement. Thus, the dynamically adjustable camshaft positions of the most recent engine generations require a high-resolution detection of the camshaft position. In addition, it is necessary to detect this camshaft position as an absolute angle. The previous sensors are not capable of meeting these requirements. An absolute angle may only be computed by the engine control unit in the dynamic case, i.e., with a rotating sensor wheel, and only coarsely on the basis of the tooth-gap combination. The sensor signal alone cannot supply an absolute angle. The resolution is also limited by the small diameter of the sensor wheels used. Minimal gap sizes, which have to be maintained, result due to these small diameters.

SUMMARY

A sensor for determining at least one rotation characteristic of a rotating element is provided, which may at least largely avoid the disadvantages of conventional sensors and is in particular capable of detecting rotation characteristics of rotating elements with high resolution and in particular detecting an absolute angle of a camshaft with high resolution.

The sensor for determining at least one rotation characteristic of a rotating element according to the present invention includes a sensor wheel, which is connectable to the rotating element, having at least one first reading track. The reading track has a first plurality of magnetic event timers. The sensor furthermore includes at least one first magnetic sensor for detecting magnetic events generated by the first plurality of magnetic event timers. The first reading track is designed in such a way that, over a complete circumference of the sensor wheel, a magnetic field strength of the first plurality of event timers changes step-by-step from a first maximum north pole to a first maximum south pole.

Accordingly, a sensor is provided, whose sensor wheel is provided with a first reading track over a complete circumference, i.e., 360°. The first reading track has a plurality of magnetic event timers. This is understood in general to mean that the sensor wheel having the first plurality of magnetic event timers is capable, depending on the design, of generating a magnetic field in the area of the sensor using each individual event timer or of changing or influencing a magnetic field existing in this area.

A magnetic event is therefore understood as any influence or change of a magnetic field in the area of the sensor. A magnetic event detected by the sensor may be used as the foundation for ascertaining the absolute angle. This is achieved in particular in that the magnetic field strength of the first plurality of event timers changes step-by-step from a first maximum north pole to a first maximum south pole over the circumference of the sensor wheel. In other words, the first reading track on the sensor wheel has precisely one maximum north pole and one maximum south pole. The magnetic field strength of the first plurality of event timers is changed step-by-step between them. More precisely, the field strength is decreased step-by-step from a maximum north pole. At, for example, 0 mT, a change to the south pole follows. The field strength is now again increased step-by-step up to a maximum south pole. Accordingly, maximum south pole and maximum north pole are adjacent to one another.

The first reading track may be designed in such a way that, over the complete circumference of the sensor wheel, the magnetic field strength of the event timers changes continuously from the first maximum north pole to the first maximum south pole. In other words, the step-by-step change of the field strength is carried out in such a way that the individual steps are selected to be infinitesimal.

The sensor wheel may furthermore include a second reading track. The second reading track may include a second plurality of magnetic event timers. The second reading track may be designed in such a way that, over a complete circumference of the sensor wheel, a magnetic field strength of the second plurality of event timers changes step-by-step from a second maximum north pole to a second maximum south pole. The magnetic field strength of the first plurality of event timers may change in a first direction. The magnetic field strength of the second plurality of event timers may change in a second direction. The second direction may be opposite to the first direction. The sensor may furthermore include a second magnetic sensor for detecting magnetic events generated by the second plurality of magnetic event timers. The first magnetic sensor may be designed to output a first signal. The second magnetic sensor may be designed to output a second signal. A differential signal from the first signal and the second signal may be usable to determine the rotation characteristic of the rotating element. A pulse-width-modulated signal may be generated from the first signal or the differential signal. The sensor wheel may furthermore include a third reading track. The third reading track may include a third plurality of magnetic event timers. The third reading track may be designed in such a way that the third plurality of event timers has multiple north poles and multiple south poles, which are situated alternately over the complete circumference of the sensor wheel. In other words, the multiple north poles and the multiple south poles are each situated as a plurality of pairs distributed over the circumference of the sensor wheel. The sensor may furthermore include a third magnetic sensor for detecting magnetic events generated by the third plurality of magnetic event timers. In particular Hall sensors may be used as the magnetic sensors, i.e., sensors having a Hall element, for example, a Hall plate. According to the present invention, the sensor may in particular detect an absolute angle of a camshaft, if the rotating element is a camshaft.

The absolute angle of a camshaft may be measured in a contactless fashion using the present invention. The present invention enables the measurement of the absolute angle with variably settable resolution.

A multi-pole sensor wheel is used to enable the measurement of an absolute angle. One to three reading tracks are magnetized thereon. The following magnetization has to be applied to at least one reading track for the absolute angle detection: Over the complete 360° of the sensor wheel, there are only two changes from north pole to south pole. 100% and −100% correspond to the maximum north pole and south pole, respectively. This means, the field strength is decreased step-by-step from a maximum north pole. At approximately 0 mT, the change to south pole takes place. The field strength is now again increased step-by-step up to a maximum south pole. Accordingly, maximum south pole and maximum north pole are adjacent to one another. This "re-magnetization" may be carried out "continuously" or in quantized fashion. A continuous re-magnetization has multiple disadvantages, but also advantages, which will both be described in greater detail hereafter.

To minimize air gap influences and other interferences, a further reading track having a magnetization inverted in relation to the first reading track may be applied. A differential signal may be formed from these two reading tracks, which is less sensitive to air gap changes and additionally, in the case of non-continuous magnetization, permits a finer quantization of the magnetization.

If this resolution is not sufficient, a third reading track may thus be applied to the sensor wheel. This reading track is alternately magnetized using north poles and south poles to generate the typical tooth-gap pairs. This third reading track cannot contribute to the resolution of the absolute angle when the engine is shut down. However, when the camshaft is rotating, signals may thus be generated which additionally subdivide the signal from the first reading track or the signals of the first and second reading tracks. Above all in the case of a quantized magnetization of the first reading track or the first and second reading tracks, a higher resolution may thus be achieved during operation.

Hall plates are used to scan the reading tracks. A pulse-width-modulated signal (duty cycle, abbreviated DC) is generated from the signals of the first reading track or the first and second reading tracks. If provided, a typical square wave signal is generated from the third reading track. The combination of these signals enables a high-resolution detection of the camshaft position. The present invention may be implemented solely with the first reading track and a DC signal, with the first and second reading tracks and a differential DC signal, or with the first through third reading tracks and the combined signal. Additional diagnostic functions may be implemented with the aid of the DC signal, in that the valid signal range is between 10% and 90%. A signal less than or greater than these values may be used for diagnosis. Frequency and signal length of the DC signal and the arrangement of the reading tracks, the magnetic field strengths, and the size of the quantization steps for the first and second reading tracks have to be optimized for the best possible performance in further development steps.

Whether a continuous or quantized magnetization is preferable is dependent on the particular requirements. Advantages of a continuous magnetization of the first and second reading tracks are, on the one hand, that the valid signal range may be detected with the aid of an algorithm from the span of maximum north pole and maximum south pole and subsequently, with the aid of the same algorithm, the quantization of the DC characteristic curve may be carried out. On the other hand, the algorithm may check the span of the magnetic field strength during each complete revolution. In the event of a trend, the quantization of the DC characteristic curve may be updated and therefore it is possible to react to changes of the span. Environmental changes such as air gap changes, temperature changes, etc. may thus be compensated for. Continuous magnetization has the disadvantage that when the sensor is turned on, an angle cannot be read out immediately, but rather a statement may only be made about whether one is located at the 180° of the north pole or the south pole. In the worst case, it may take one complete camshaft revolution until the maximum north pole and the maximum south pole have been detected once and therefore a DC signal may be calculated.

These observations relate to measurements which were carried out on the basis of the Hall effect. In principle, XMR-based measurement principles (X-magnetoresistive) may also be used. The magnetization of the reading tracks has to be adapted accordingly. An approach using a 3D Hall sensor would also be conceivable.

BRIEF DESCRIPTION OF THE DRAWINGS

Further optional details and features of the present invention result from the following description of preferred exemplary embodiments, which are schematically shown in the figures.

DETAILED DESCRIPTION OF EXAMPLE EMBODIMENTS

Figure 1:
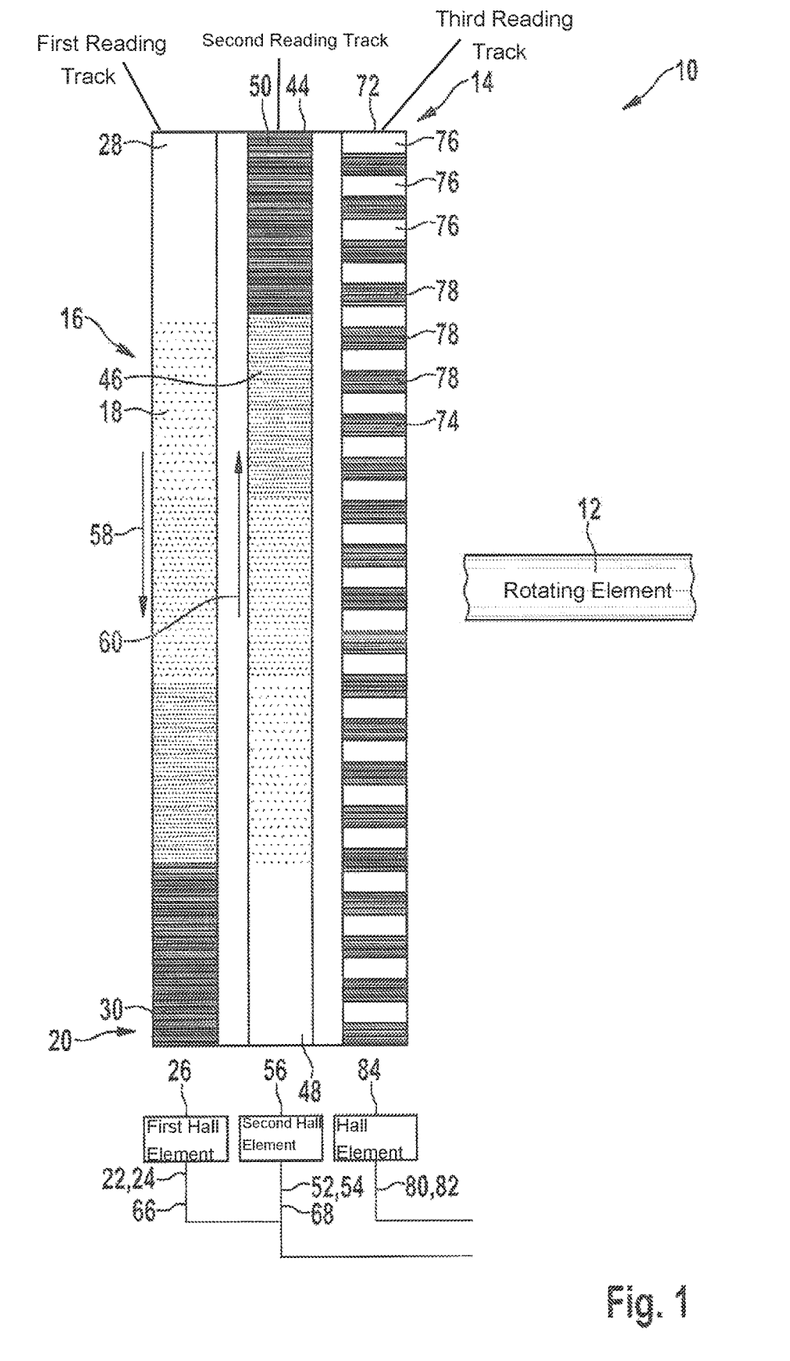
FIG. 1 shows a schematic setup of a sensor for determining at least one rotation characteristic of a rotating element.

FIG. 1 shows the setup of a sensor 10 for determining at least one rotation characteristic of a rotating element 12. Rotating element 12 is, for example, a camshaft of an internal combustion engine. Sensor 10 includes a sensor wheel 14, which is connectable to rotating element 12. Sensor wheel 14 includes at least one first reading track 16. First reading track 16 includes a plurality of magnetic event timers 18. First reading track 16 is situated on sensor wheel 14 in such a way that first reading track 16 extends over a complete circumference 20 of sensor wheel 14. In other words, first reading track 16 covers a complete circumference or 360° of sensor wheel 14.

Sensor 10 furthermore includes at least one first magnetic sensor 22. First magnetic sensor 22 is a first Hall sensor 24 and includes at least one first Hall element 26 in the form of, for example, a Hall plate. First reading track 16 is designed in such a way that, over complete circumference 20 of sensor wheel 14, a magnetic field strength of the first plurality of event timers 18 changes step-by-step from a first maximum north pole 28 to a first maximum south pole 30. First reading track 16 is in particular designed in such a way that, over complete circumference 20 of sensor wheel 14, the magnetic field strength of the first plurality of event timers changes continuously from first maximum north pole 28 to first maximum south pole 30. In other words, the step-by-step change of the magnetic field strength is infinitesimal.

Figure 2:
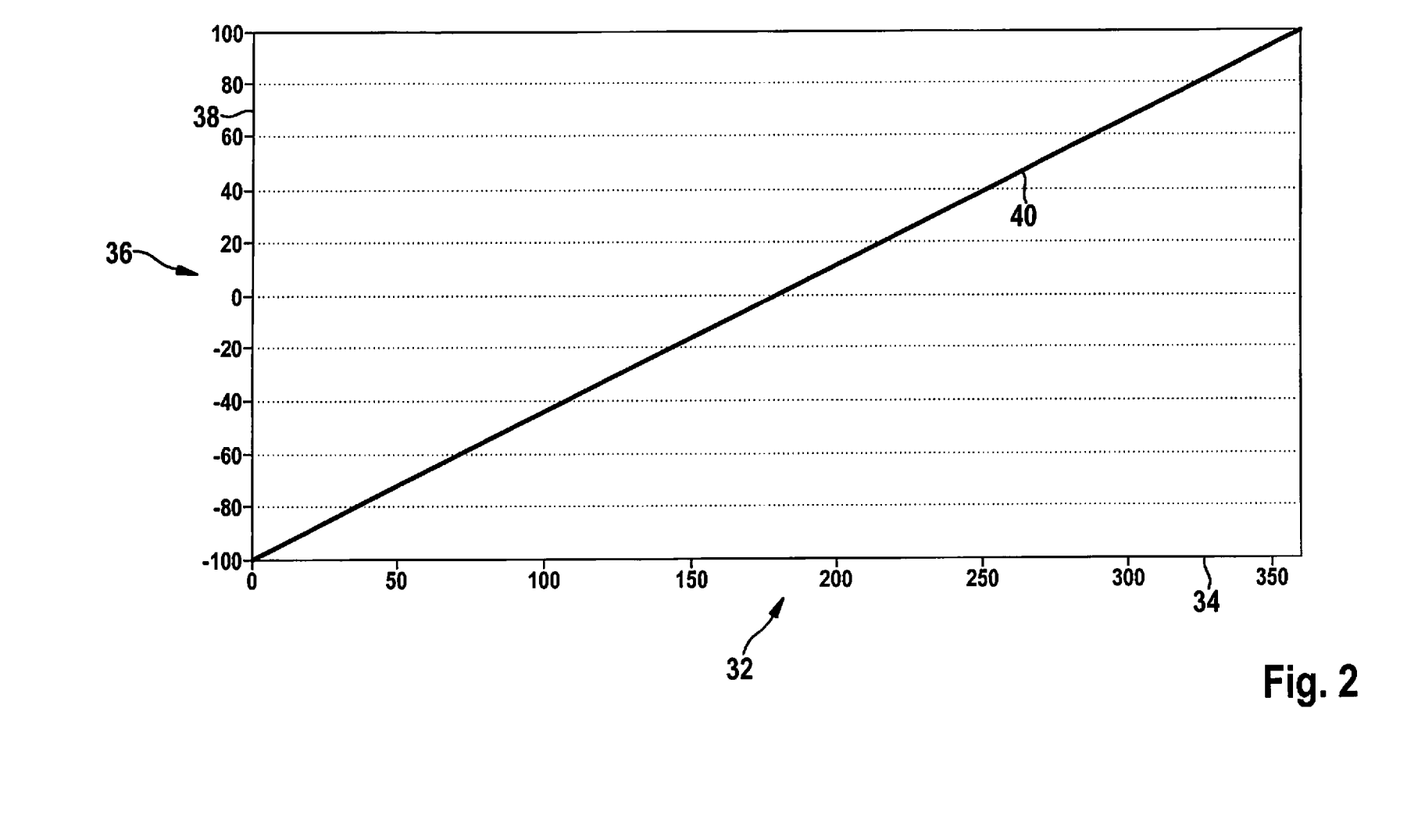
FIG. 2 shows a diagram to illustrate the relationship between magnetic field strength or magnetization and the angle of the rotating element.

FIG. 2 shows the relationship between an angle 32, in particular an absolute angle of rotating element 12, which is plotted on X axis 34, and the magnetic field strength of the first plurality of event timers 18 or the degree of magnetization 36 of first reading track 16, expressed in percent, for example, which is plotted on Y axis 38. Curve 40 indicates the magnetization as a function of angle 32. Thus, for example, a magnetization of 100% is associated with maximum north pole 28 and a magnetization of −100% is associated with maximum south pole 30. Furthermore, it is apparent that an absolute angle 32 of 0° is associated with maximum south pole 30 and an absolute angle 32 of 360° is associated with maximum north pole 28. Furthermore, it is apparent that the magnetic field strength is decreased step-by-step from maximum north pole 28. The steps are selected to be so small that the magnetization according to curve 40 changes linearly with angle 32. At a magnetization of 0% or 0 mT as the magnetic field strength, the change to south pole takes place. The field strength is now again increased step-by-step up to maximum south pole 30. Accordingly, maximum south pole 30 and maximum north pole 28 are adjacent to one another. Furthermore, it is apparent that this "re-magnetization" takes place continuously.

Figure 3:
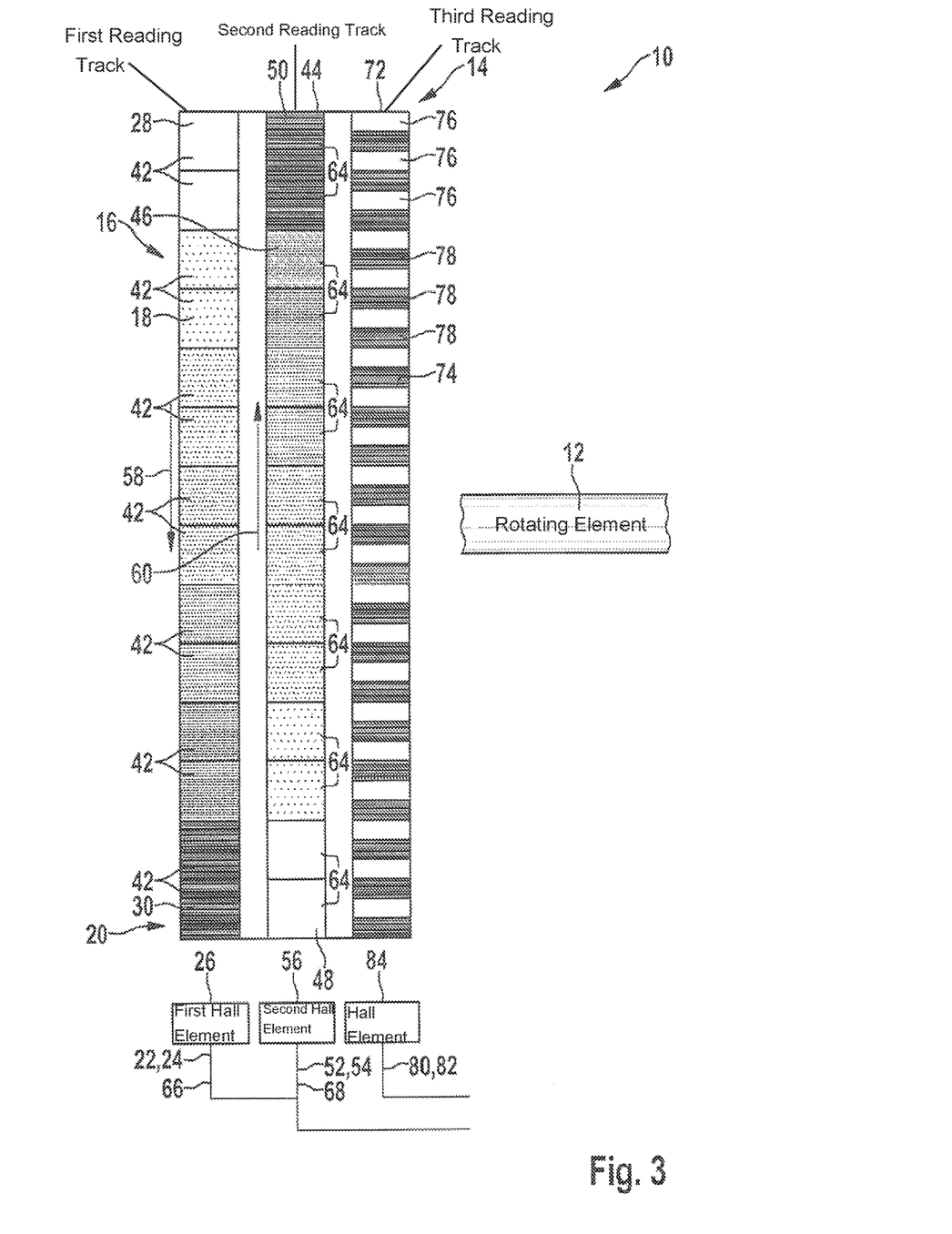
FIG. 3 shows a setup of a further sensor for determining at least one rotation characteristic of a rotating element.

FIG. 3 shows the setup of a further sensor 10 for determining at least one rotation characteristic of a rotating element 12. Only the differences from the preceding specific embodiment are described hereafter and identical components are provided with identical reference numerals. It is apparent that in sensor 10 of FIG. 3, the change of the magnetic field strength of the first plurality of magnetic event timers 18 of first reading track 16 takes place in equal steps 42.

Figure 4:
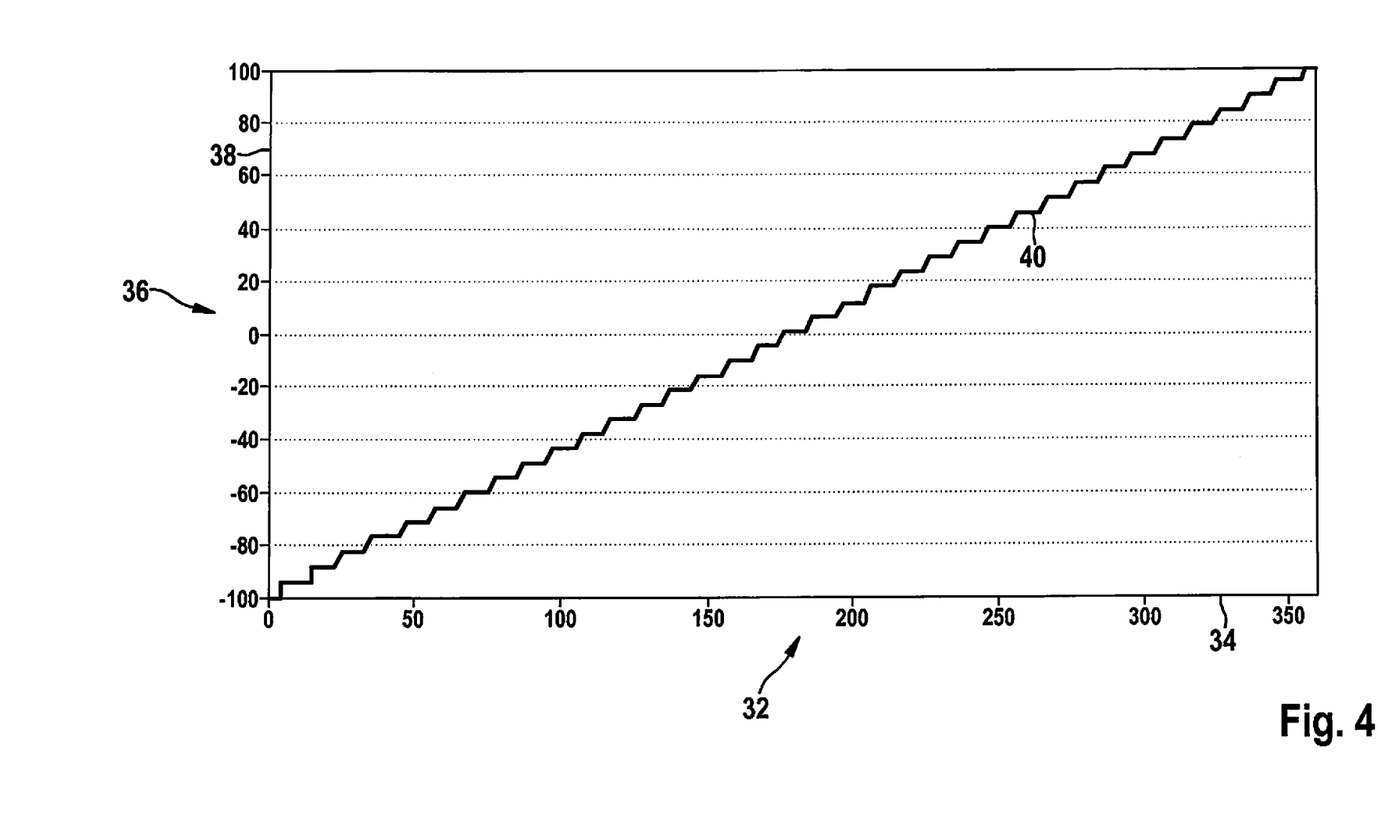
FIG. 4 shows a diagram to illustrate the relationship between magnetic field strength or magnetization and the angle of the rotating element.

FIG. 4 shows the corresponding relationship between angle 32 and magnetization 36. It is apparent that the re-magnetization takes place in quantized fashion as a result of steps 42.

With reference to FIG. 1, sensor 10 may be designed in such a way that sensor wheel 14 optionally includes a second reading track 44 including a second plurality of magnetic event timers 46. Second reading track 44 is designed in such a way that, over complete circumference 20 of sensor wheel 14, a magnetic field strength of the second plurality of magnetic event timers 46 changes step-by-step from a second maximum north pole 48 to a second maximum south pole 50. Sensor 10 furthermore includes a second magnetic sensor 52 for detecting magnetic events generated by the second plurality of magnetic event timers 46. Second magnetic sensor 52 may be a second Hall sensor 54. Accordingly, second magnetic sensor 52 or second Hall sensor 54 includes a second Hall element 56 in the form, for example, of a "Hall plate". Hall elements 26, 56 may also be combined into a single magnetic sensor.

It is furthermore apparent in FIG. 1 that the magnetic field strength of the first plurality of magnetic event timers 18 changes in a first direction 58. The magnetic field strength of the second plurality of magnetic event timers 46 changes in a second direction 60. Second direction 60 is opposite to first direction 58.

Figure 5:
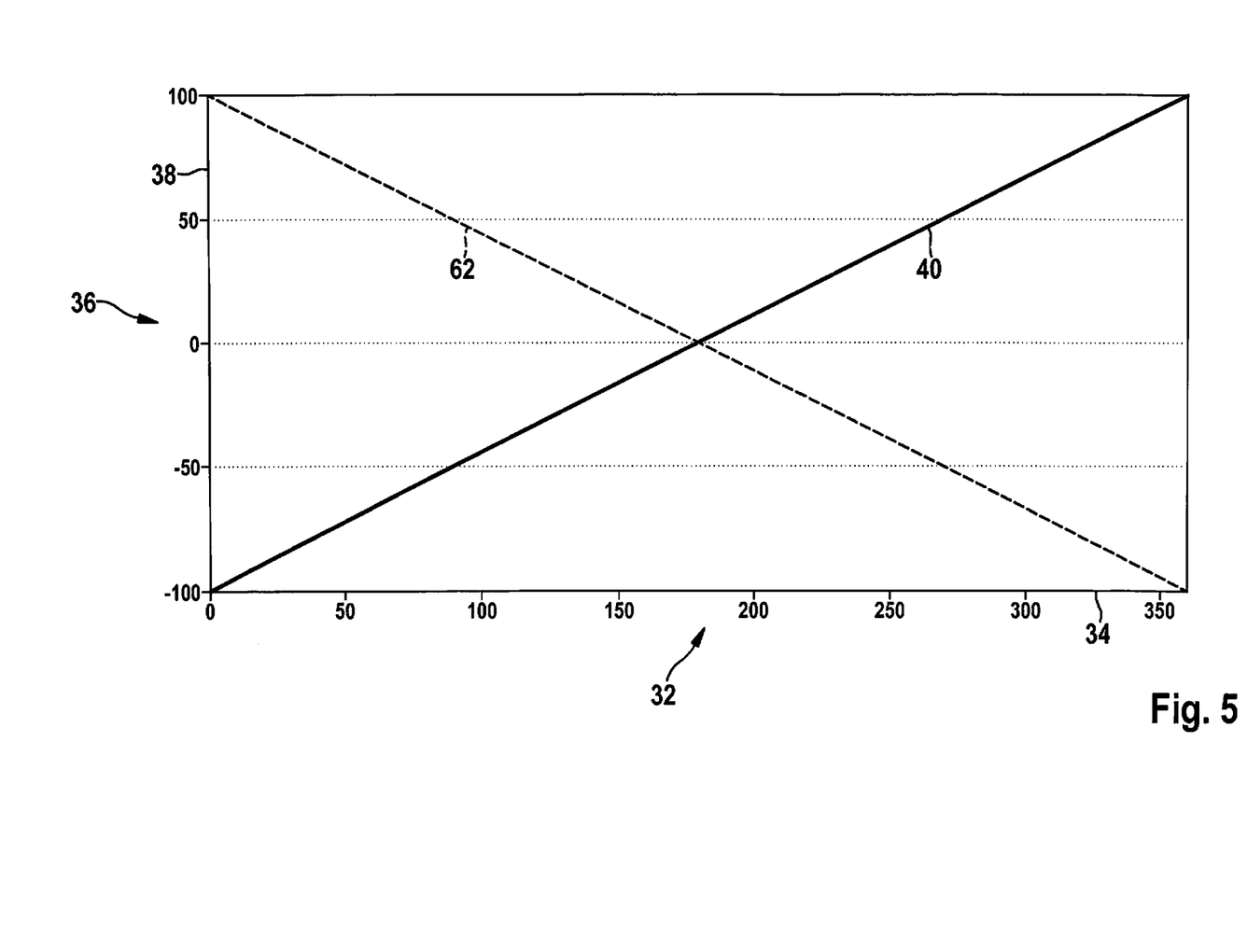
FIG. 5 shows a diagram to illustrate the relationship between magnetic field strength or magnetization and the angle of the rotating element.

FIG. 5 shows the relationship between angle 32 and magnetization 36 if two reading tracks 16, 44 are provided on sensor wheel 14 in the way described. Curve 62 indicates the magnetization of second reading track 44. It is apparent that curve 40 of first reading track 16 and curve 62 of second reading track 44 extend in opposite directions, since the magnetic field strength of the second plurality of magnetic event timers 46 changes in the opposite direction to the magnetic field strength of the first plurality of magnetic event timers 18. This is used to minimize air gap influences and other interferences.

With reference to FIG. 3, a further modification of the sensor shown therein is described. Similarly, to the view of FIG. 1, second reading track 44 may also be changed step-by-step in its magnetic field strength, for example, using equal steps 64.

Figure 6:
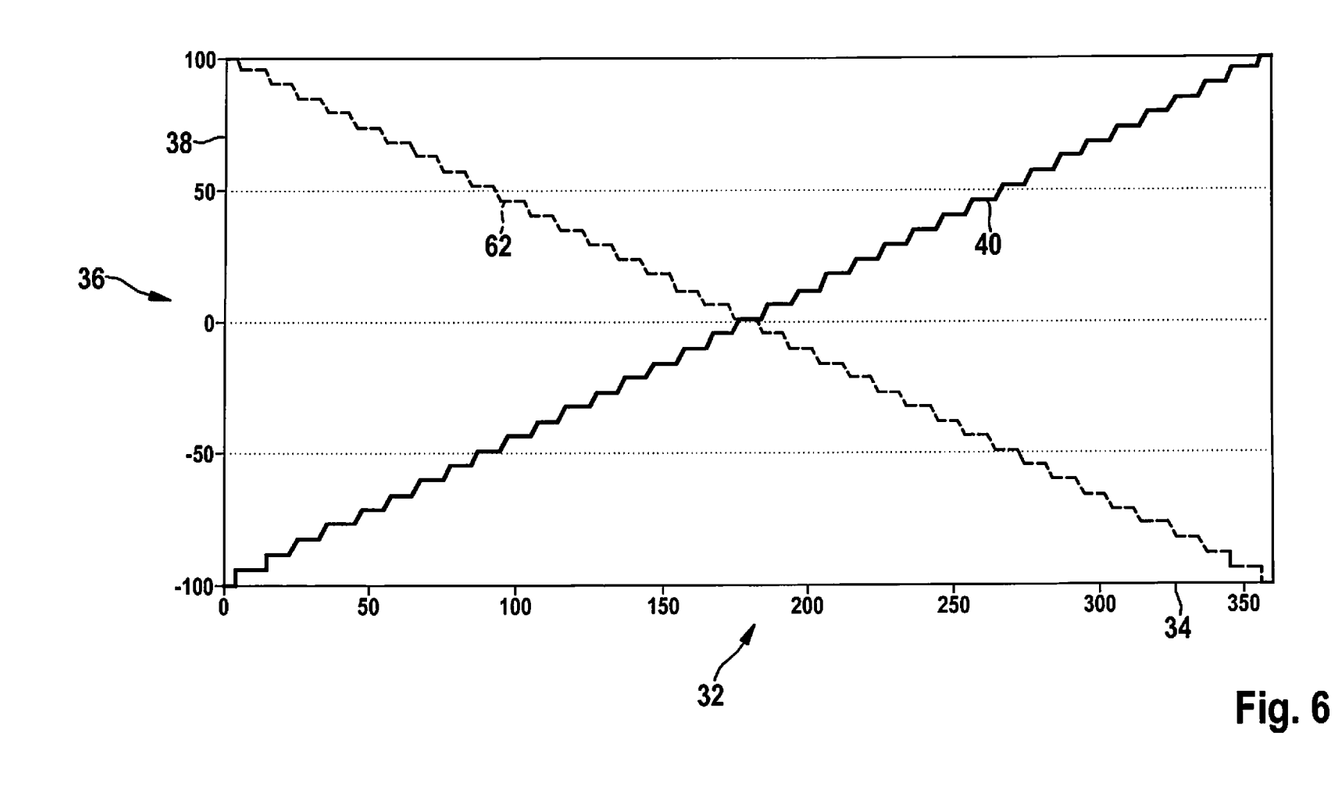
FIG. 6 shows a diagram to illustrate the relationship between magnetic field strength or magnetization and the angle of the rotating element.

FIG. 6 shows the corresponding relationship between angle 32 and magnetization 36 on the basis of curves 40 and 62. The step-by-step change of the magnetization caused by steps 42, 64 in quantized form is apparent.

Figure 7:
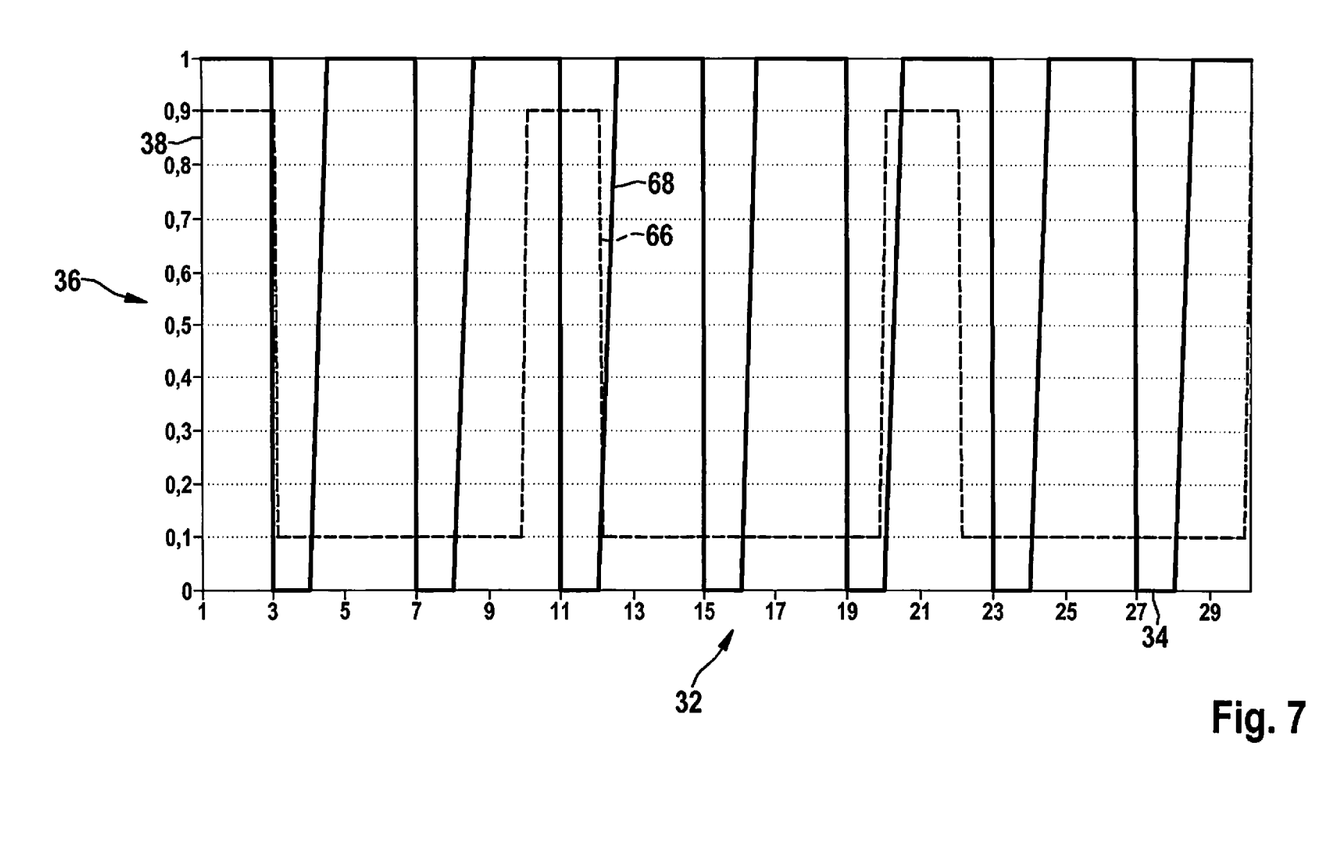
FIG. 7 shows a diagram to illustrate the overall combination of the output signals including pulse-width-modulated signal and incremented signal.

FIG. 7 shows a diagram to illustrate the overall combination of the output signals made up of pulse-width-modulated and incremented signals. As shown in FIG. 7, first magnetic sensor 22, or the internal differential signal of magnetic sensor 22 minus magnetic sensor 52, may be designed to output a first signal 66. Third magnetic sensor 82 may be designed to output a second signal 68. The determination of the rotation characteristic of rotating element 12 may be carried out from first signal 66 or the combination of first signal 66 and second signal 68.

FIG. 7 shows a further modification of the sensors described in FIG. 1 and FIG. 3. First signal 66 may thus be a pulse-width-modulated signal. Second signal 68 may also be a pulse-width-modulated signal which has 1-2 fixed pulse widths. The second pulse width may be used for a rotational direction detection. First signal 66 or second signal 68 is pulse-width-modulated as a function of the rotational direction, for example, using a so-called duty cycle as a function of the magnetic field strength, in the example 20%. This permits a still more accurate resolution of the absolute angle position. Thus, angle 32 is still plotted on X axis 34 and associated signal value 70, which may change between 0 and 1, is plotted on Y axis 38.

A further modification will be described with reference to FIG. 1 and FIG. 3. Sensor wheel 14 may thus include a third reading track 72. Third reading track 72 may include a third plurality of magnetic event timers 74. Third reading track 72 is designed in such a way that the third plurality of event timers 74 includes multiple north poles 76 and multiple south poles 78, which are situated alternately over complete circumference 20 of sensor wheel 14. This applies accordingly to the sensor of FIG. 3. A third magnetic sensor 80 may be provided for detecting magnetic events generated by the third plurality of magnetic event timers 74. Third magnetic sensor 80 may also be a Hall sensor, in particular, a third Hall sensor 82, which includes a Hall element 84. The interconnection of Hall elements 26, 56, 84 is also shown. Hall elements 26, 56, 84 may also be combined into a single magnetic sensor.

Figure 8:
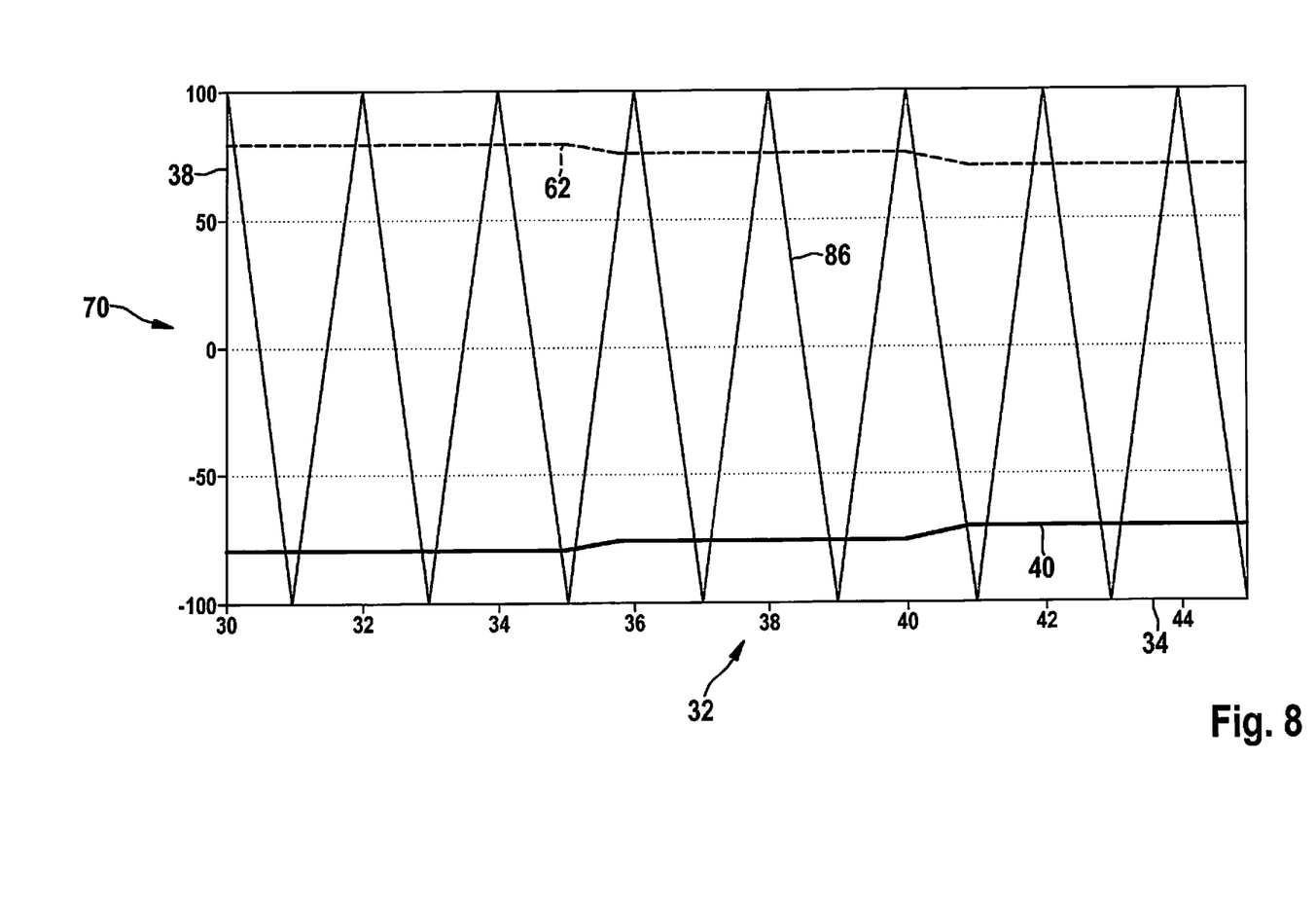
FIG. 8 shows a diagram to illustrate the relationship between magnetic field strength or magnetization and the angle of the rotating element.

FIG. 8 shows the relationship between angle 32 and magnetization 36 with curve 40 as first signal 66, curve 62 as second signal 68, and a curve 86 as the third signal of third reading track 72. Third reading track 72 is used to further increase the resolution. Third reading track 72 is accordingly alternately magnetized with north poles 76 and south poles 78, to generate the typical tooth-gap pairs of a typical sensor wheel. Third reading track 72 cannot contribute to the resolution of the absolute angle when the engine is shut down. When the camshaft is rotating, however, signals may thus be generated, which additionally subdivide the signal of first reading track 16 and second reading track 44, as shown in FIG. 8. Above all, in the case of a quantized magnetization of first reading track 16 or first reading track 16 and second reading track 44, a higher resolution may thus be achieved during operation. The combination of these signals enables a high-resolution detection of the camshaft position.

What is claimed is:

1. A sensor for determining at least one rotation characteristic of a rotating element, comprising:
   a sensor wheel, which is connectable to the rotating element, the sensor wheel including at least one first reading track, the reading track including a first plurality of magnetic event timers; and
   at least one first magnetic sensor for detecting magnetic events generated by the first plurality of magnetic event timers;
   wherein:
   the first reading track is designed in such a way that, over a complete circumference of the sensor wheel, a magnetic field strength of the first plurality of event timers changes step-by-step from a first maximum north pole to a first maximum south pole,
   the rotating characteristic is an absolute angle of the rotating element, and
   a plurality of the magnetic event timers are disposed along a circumference of the first reading track and between the first maximum north pole and the first maximum south pole such that an amount of the magnetic timers per unit area along the circumference varies between the first maximum north pole and the first maximum south pole.

2. The sensor as recited in the claim 1, wherein the first reading track is designed in such a way that, over the complete circumference of the sensor wheel, the magnetic field strength of the first plurality of event timers changes continuously from the first maximum north pole to the first maximum south pole.

3. The sensor as recited in claim 1, wherein the sensor wheel includes a second reading track, the second reading track including a second plurality of magnetic event timers, the second reading track being designed in such a way that, over the complete circumference of the sensor wheel, a magnetic field strength of the second plurality of event timers changes step-by-step from a second maximum north pole to a second maximum south pole.

4. The sensor as recited in claim 3, wherein the magnetic field strength of the first plurality of event timers changes in a first direction, the magnetic field strength of the second plurality of event timers changing in a second direction, the second direction being opposite to the first direction.

5. The sensor as recited in claim 4, further comprising:
   a second magnetic sensor for detecting magnetic events generated by the second plurality of magnetic event timers.

6. The sensor as recited in claim 5, wherein the first magnetic sensor is designed to output a first signal or a differential signal from the first magnetic sensor and the second magnetic sensor is designed to output a second signal.

7. The sensor as recited in claim 6, wherein a first pulse-width-modulated signal and a second pulse-width-modulated signal are generated from the first signal and the second signal.

8. The sensor as recited in claim 3, wherein the sensor wheel includes a third reading track, the third reading track including a third plurality of magnetic event timers, the third reading track being designed in such a way that the third plurality of event timers has multiple north poles and multiple south poles, which are situated alternately over the complete circumference of the sensor wheel.

9. The sensor as recited in claim 8, further comprising:
   a third magnetic sensor for detecting magnetic events generated by the third plurality of magnetic event timers.

10. The sensor as recited in claim 1, wherein the rotating element is a camshaft.

11. The sensor as recited in claim 1, wherein the absolute angle is associated with a single value for the magnetic field strength.

* * * * *